(12) United States Patent
Zhang et al.

(10) Patent No.: US 9,084,034 B2
(45) Date of Patent: Jul. 14, 2015

(54) METHOD AND SYSTEM FOR REALIZING POWER SAVING MECHANISM MANAGEMENT BETWEEN OPTICAL NETWORK UNIT (ONU) AND OPTICAL LINE TERMINAL (OLT)

(75) Inventors: Dezhi Zhang, Shenzhen (CN); Yuanling He, Shenzhen (CN); Meiyan Zang, Shenzhen (CN); Liquan Yuan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 156 days.

(21) Appl. No.: 13/641,950

(22) PCT Filed: Mar. 9, 2011

(86) PCT No.: PCT/CN2011/071627
§ 371 (c)(1),
(2), (4) Date: Oct. 18, 2012

(87) PCT Pub. No.: WO2012/034385
PCT Pub. Date: Mar. 22, 2012

(65) Prior Publication Data
US 2013/0034355 A1    Feb. 7, 2013

(30) Foreign Application Priority Data

Sep. 17, 2010    (CN) .......................... 2010 1 0287310

(51) Int. Cl.
*H04B 10/08*    (2006.01)
*H04B 10/20*    (2006.01)
(Continued)

(52) U.S. Cl.
CPC .......... *H04Q 11/0067* (2013.01); *H04B 10/272* (2013.01); *H04J 14/0227* (2013.01); *H04Q 2011/0079* (2013.01); *H04Q 2011/0088* (2013.01)

(58) Field of Classification Search
None
See application file for complete search history.

(56) References Cited

U.S. PATENT DOCUMENTS 8,000,602 B2 *    8/2011    Haran et al. .................... 398/72
8,498,534 B2 *    7/2013    Hirth et al. ..................... 398/25
(Continued)

FOREIGN PATENT DOCUMENTS

CN    1859438 A    11/2006
CN    101820349 A    9/2010
(Continued)

OTHER PUBLICATIONS

ITU-T, Series G supplement 45, Series G: Transmission Systems and Media, Digital Systems and Network, May 2009.*
(Continued)

*Primary Examiner* — Ken Vanderpuye
*Assistant Examiner* — Jai Lee
(74) *Attorney, Agent, or Firm* — Oppedahl Patent Law Firm LLC

(57) ABSTRACT

The disclosure provides a method and system for realizing power saving mechanism management between an Optical Network Unit (ONU) and an Optical Line Terminal (OLT). The method includes: passing power saving information between the ONU and the OLT through an extended Operation Administration and Maintenance (OAM) frame; closing/opening an optical module of the ONU based on the obtained power saving information. With the method of the disclosure, the optical module is closed in time when the optical module of the ONU is not needed, thus reducing power consumption of the ONU, and enabling interaction between the ONU and the OLT to meet the requirement for power saving and emission reduction.

9 Claims, 6 Drawing Sheets

(51) Int. Cl.
*H04J 14/00* (2006.01)
*H04B 10/00* (2013.01)
*H04Q 11/00* (2006.01)
*H04B 10/272* (2013.01)
*H04J 14/02* (2006.01)

(56) References Cited

U.S. PATENT DOCUMENTS

| | | | |
|---|---|---|---|
| 2005/0250452 A1* | 11/2005 | Walton et al. | 455/63.4 |
| 2007/0140691 A1 | 6/2007 | Gao | |
| 2008/0212964 A1 | 9/2008 | Gao | |
| 2010/0111325 A1 | 5/2010 | Matsuo | |
| 2010/0111523 A1 | 5/2010 | Hirth et al. | |
| 2010/0118753 A1 | 5/2010 | Mandin | |
| 2011/0145406 A1* | 6/2011 | Ze et al. | 709/224 |
| 2012/0027411 A1 | 2/2012 | Gao | |
| 2012/0030320 A1* | 2/2012 | Diab et al. | 709/220 |
| 2012/0148246 A1* | 6/2012 | Mukai et al. | 398/58 |
| 2012/0301145 A1* | 11/2012 | Kozaki et al. | 398/58 |
| 2013/0045005 A1* | 2/2013 | Nakura et al. | 398/25 |
| 2013/0236179 A1 | 9/2013 | Gao | |
| 2013/0259468 A1* | 10/2013 | Kubo et al. | 398/9 |

FOREIGN PATENT DOCUMENTS

| | | |
|---|---|---|
| EP | 1801984 A1 | 6/2007 |
| JP | 2009260970 A | 11/2009 |
| WO | 2010098262 A1 | 9/2010 |

OTHER PUBLICATIONS

Kopper, the Linux Enterprise Cluster: Build a Highly Available Cluster with Commodity Hardware and Free Software, 2005, William Pollock, pp. 111-112.*
Ethernet OAM Configuration, Jun. 24, 2009.*
Event Notification OAMPDU, Nov. 13, 2002.*
International Telecommunication Union, Editors G.984.3, White paper: Means and impact of power conservation, Geneva, Nov. 30, 2008.
International Telecommunication Union, Series G: Transmission Systems and Media, Digital Systems and Networks, Supplement 45, GPON power conservation, May 15, 2009.
Supplementary European Search Report in European application No. 11824456.5, mailed on Feb. 21, 2014.
International Search Report in international application No. PCT/CN2011/071627, mailed on Jun. 30, 2011.
English Translation of the Written Opinion of the International Search Authority in international application No. PCT/CN2011/071627, mailed on Jun. 30, 2011.

* cited by examiner

METHOD AND SYSTEM FOR REALIZING POWER SAVING MECHANISM MANAGEMENT BETWEEN OPTICAL NETWORK UNIT (ONU) AND OPTICAL LINE TERMINAL (OLT)

TECHNICAL FIELD

The disclosure relates to the power saving and emission reduction technology in the field of a Passive Optical Network (PON), and in particular to a method and system for realizing interaction between an Optical Network Unit (ONU) and an Optical Line Terminal (OLT).

BACKGROUND

With the development of broadband access technology, the operators are gradually accepting and deploying the Optical Access Network (OAN) to provide services with higher rate and higher quality to users. The PON technology is a point-to-multipoint optical access technology; FIG. 1 shows a schematic diagram illustrating network architecture of an existing PON; as shown in FIG. 1, the PON is composed of the OLT, the ONU and an Optical Distribution Network (ODN), wherein the ODN is of point-to-multipoint structure, and one OLT is connected with multiple ONUs through a splitter in the ODN.

With the progressive deployment and operation of the PON in the world, the number of the ONUs increases significantly with increase of the number of broadband users. At present, more and more requirements for power saving and emission reduction of the communication equipment are made. In 2009, power consumption of the single ONU operating in a full-load state is about 9 watts, and the specific value varies according to the implementation of the equipments of different manufactures. The value of power consumption has a certain room for further reduction with the increase of integrated level of the digital chip and the optimization of parts of optical components; at present, the European Union expects power consumption to be reduced by about 15% two years later.

Actually, power consumption of an optical module in the ONU is an important part of power consumption of the whole ONU equipment. In terms of actual use of users, there is usually no data stream generated when users surf the Internet, at this point, the optical module of the ONU is not needed; however, in the standard definition mechanism of the Ethernet PON (EPON), the optical module of the ONU keeps opening/closing to perform normal data communication with the OLT; as a result, the power is consumed in vain, and it is of no real benefit to the service for users, which goes against the requirement for power saving and emission reduction.

SUMMARY

In view of the above, the disclosure aims to provide a method and system for realizing power saving mechanism management between an ONU and an OLT, which can reduce power consumption of the ONU and meet the requirement for power saving and emission reduction.

For achieving the object, the following technical solutions are provided.

In one aspect, A method for realizing power saving mechanism management between an Optical Network Unit (ONU) and an Optical Line Terminal (OLT) is provided, the method includes: passing power saving information between the ONU and the OLT through an extended Operation Administration and Maintenance (OAM) frame; and closing/opening an optical module of the ONU based on the obtained power saving information.

The power saving information may be included in an organization specific information Type-Length-Value (TLV) field that is in an OAM Protocol Data Unit (PDU) information message of the extended OAM frame; or the power saving information may be included in an extended OAM event notification message of the extended OAM frame; or the power saving information may be included in an extended OAM PDU format of the extended OAM frame.

The power saving information may include a power saving mechanism indication for indicating a power saving mechanism that is entered.

The power saving information may include duration information of a power saving mechanism that is entered.

The power saving mechanism may include doze, fast-sleep, deep-sleep, or cyclic-sleep.

Passing power saving information may include:

the ONU uplinks the power saving information to the OLT through a message; and/or the OLT transmits the power saving information to the ONU through a message.

When a power saving mechanism indicated by a power saving mechanism indication in the power saving information is a fast-sleep mechanism, the ONU and the OLT performing power saving control based on the obtained power saving information by closing/opening the optical module of the ONU may include:

the ONU switching from a normal state to the fast-sleep state when the ONU is instructed to enter the fast-sleep state, closing uplink and downlink optical modules, and triggering a timer T1, wherein a timing length of the timer T1 is set as sleep duration included in the power saving mechanism indication; the ONU responding to neither service requests nor messages from the OLT; after the timer T1 expires, the ONU opening the uplink and downlink optical modules, switching from the fast-sleep state to a synchronization state, and returning to the normal state after receiving a downlink frame of the OLT and completing synchronization;

after the ONU is instructed by the OLT to enter the fast-sleep state, the OLT inhibiting alarms caused by a case that the ONU fails to respond to an instruction from the OLT, and buffering data stream to be transmitted to the ONU in a downlink direction; the OLT starting a timer T2, wherein timeout of the timer T2 is set as a sleep duration value included in an instruction sent by the OLT; after the timer T2 expires, the OLT switching from a sleep wait state to the normal state, and performing normal data communication with the ONU.

The method may further include prior steps of:

when being in the normal state and in a process of performing normal communication with the ONU, receiving, by the OLT, from a network administrator a command of requiring controlling the ONU to enter the fast-sleep state; or, detecting, by a Media Access Control (MAC) of the OLT, uplink stream of the ONU in real time, and finding that there is no uplink stream in a preset period of time.

When a power saving mechanism indicated by a power saving mechanism indication in the power saving information is a deep-sleep mechanism, the ONU and the OLT performing power saving control based on the obtained power saving information by closing/opening the optical module of the ONU may include:

closing, by the ONU, uplink and downlink optical modules when entering a deep-sleep state, and triggering a timer T1 of the ONU; after the timer T1 expires, or when the ONU detects that there is uplink data stream to be transmitted on a user port, opening, by the ONU, uplink and downlink optical modules, and entering a synchronization state; notifying, by the ONU, the OLT that the ONU exits the deep-sleep state after completing downlink frame synchronization with the OLT in the synchronization state;

after receiving notification that the ONU enters the deep-sleep state, inhibiting, by the OLT, alarms caused by a case that the ONU fails to respond to an instruction from the OLT because of entering the deep-sleep state, buffering data stream to be transmitted to the ONU in a downlink direction; after receiving notification from the ONU informing that the ONU exits the deep-sleep state, performing, by the OLT, normal data communication with the ONU.

The method may further include prior steps of:
when detecting that there is no uplink and downlink data stream to be communicated with the OLT in the normal state, notifying, by the ONU, the OLT that the ONU enters the deep-sleep state, and indicating duration of deep-sleep; wherein a timing length of the timer T1 is set as the sleep duration in notification.

The method may further include prior steps of:
when detecting that there is no uplink and downlink data stream to be communicated with the OLT in the normal state, notifying, by the ONU, the OLT that the ONU enters the deep-sleep state;
wherein a timing length of the timer T1 is set as duration of this deep-sleep, which is preset by the ONU.

The method may further include: when no uplink data stream to be transmitted is detected by the ONU after the timer T1 expires, resetting the timer T1 according to duration of this deep-sleep, which is preset by the ONU, and keeping waiting.

The method may further include: after the ONU is wakened from the deep-sleep state that is kept in a preset period of time, ranging by the ONU again.

When a power saving mechanism indicated by a power saving mechanism indication in the power saving information is a doze mechanism, the ONU and the OLT performing power saving control based on the obtained power saving information by closing/opening the optical module of the ONU may include:
notifying, by the ONU, the OLT when requiring entering and exiting a doze mode; closing, by the ONU, an uplink optical module when entering the doze mode, and opening the uplink optical module when exiting the doze mode;
learning, by the OLT, that the ONU requires entering or exiting the doze mode through notification and confirming it.

The method may further include: when the ONU is in the doze mode, detecting, between the ONU and the OLT, whether the ONU is in a permanent doze state through a heartbeat message.

When a power saving mechanism indicated by a power saving mechanism indication in the power saving information is a cyclic-sleep power saving mechanism, the ONU and the OLT performing power saving control based on the obtained power saving information by closing/opening the optical module of the ONU may include:
entering, by the ONU, a cyclic power saving state, closing uplink and downlink optical modules, and starting a timer $T_{exit}$ according to a cyclic power saving time allocation that is configured by the OLT or set by the ONU itself;

after the timer $T_{exit}$ expires, exiting, by the ONU, the cyclic power saving state, entering a cyclic power saving wakened state, and opening uplink and downlink optical modules; and before the timer $T_{exit}$ expires, entering, by the ONU, an initial state and starting a timer $T_{initial}$ when the ONU receives a command of exiting the cyclic-sleep power saving mechanism or a command of waking up, which is sent by the OLT through an extended OAM channel, or when the ONU locally detects that there are events of triggering exit of the cyclic-sleep power saving mode, wherein the events include transmission of uplink data.

The method may further include prior steps of:
when detecting that there is no data stream to be received or transmitted in a cyclic power saving activated state, the ONU starting to apply the cyclic-sleep power saving mechanism to save power, setting its own state as a cyclic power saving wakened state, starting the timer $T_{cyclic\ power\ saving}$;
the ONU entering the cyclic power saving state after the timer $T_{cyclic\ power\ saving}$ expires; and
before the timer $T_{cyclic\ power\ saving}$ expires, the ONU entering the initial state, and starting the timer $T_{initial}$ when the ONU receives the command of exiting the cyclic-sleep power saving mechanism or the command of waking up from the OLT or when the ONU locally detects that there are events of triggering exit of the cyclic-sleep power saving mode, wherein the events include transmission of uplink data.

The method may further include prior steps of:
after entering the initial state, the ONU receiving a command of permitting to enter the cyclic-sleep power saving mechanism, which is sent by the OLT through the extended OAM channel, starting the timer $T_{initial}$, and entering the cyclic power saving activated state after the timer $T_{initial}$ expires.

The method may further include prior steps of:
sending, by the OLT, the ONU the command of exiting the cyclic-sleep power saving mechanism or the command of waking up through the extended OAM channel.

When a power saving mechanism indicated by a power saving mechanism indication in the power saving information is a doze sleep power saving mechanism, the ONU and the OLT performing power saving control based on the obtained power saving information by closing/opening the optical module of the ONU may include:
entering, by the ONU, a doze power saving state, closing an uplink optical module, and starting a timer $T_{exit}$ according to a doze power saving time allocation that is configured by the OLT or set by the ONU itself;

after the timer $T_{exit}$ expires, exiting, by the ONU, the doze power saving state, entering a doze power saving wakened state, and opening the uplink optical module; and before the timer $T_{exit}$ expires, entering, by the ONU, the initial state and starting a timer $T_{initial}$ when the ONU receives a command of exiting the doze sleep power saving mechanism or a command of waking up, which is sent by the OLT through an extended OAM channel, or when the ONU locally detects that there are events of triggering exit of the doze sleep power saving mode, wherein the events include transmission of uplink data.

The method may further include prior steps of:
when detecting that there is no data stream to be received or transmitted in a doze power saving activated state, the ONU starting to apply the doze sleep power saving mechanism to save power, setting its own state as the doze power saving wakened state, starting a timer $T_{doze\ power\ saving}$, and entering the doze power saving state after the timer $T_{doze\ power\ saving}$ expires; and before the timer $T_{doze\ power\ saving}$ expires, the ONU entering the initial state, and starting the timer $T_{initial}$ when the ONU receives a command of exiting the doze sleep power saving mechanism or a command of waking up from the OLT or when the ONU locally detects that there are events of triggering exit of the doze sleep power saving mode, wherein the events include transmission of uplink data.

The method may further include prior steps of:

after entering the initial state, the ONU receiving a command of permitting to enter the doze sleep power saving mechanism, which is sent by the OLT through the extended OAM channel, starting the timer $T_{initial}$, and entering the doze power saving activated state after the timer $T_{initial}$ expires.

The method further may include: sending, by the OLT, the ONU the command of exiting the doze sleep power saving mechanism or the command of waking up through the extended OAM channel.

In another aspect, a system for realizing power saving mechanism management between an Optical Network Unit (ONU) and an Optical Line Terminal (OLT) is provided, the system at least includes the ONU and the OLT;

wherein the ONU is configured to pass power saving information between the ONU and the OLT through an extended Operation Administration and Maintenance (OAM) frame, and perform power saving control based on the obtained power saving information by closing/opening an optical module; and wherein the OLT is configured to pass power saving information between the OLT and the ONU through the extended OAM frame, and perform power saving control based on the obtained power saving information.

When a power saving mechanism indicated by a power saving mechanism indication in the power saving information is a doze mechanism, the ONU may be further configured to:

notify the OLT when requiring entering and exiting a doze mode;

close an uplink optical module when entering the doze mode; and open the uplink optical module when exiting the doze mode; and the OLT may be further configured to learn through notification that the ONU requires entering or exiting the doze mode and confirm it.

When a power saving mechanism indicated by a power saving mechanism indication in the power saving information is a cyclic power saving mechanism, the ONU may be further configured to:

enter a cyclic power saving state, close uplink and downlink optical modules, and start a timer $T_{exit}$ according to a cyclic power saving time allocation that is configured by the OLT or set by the ONU itself;

after the timer $T_{exit}$ expires, exit the cyclic power saving state, enter a cyclic power saving wakened state, and open uplink and downlink optical modules; and before the timer $T_{exit}$ expires, enter an initial state, and start a timer $T_{initial}$ when the ONU receives a command of exiting the cyclic-sleep power saving mechanism or a command of waking up, which is sent by the OLT through an extended OAM channel, or when the ONU locally detects that there are events of triggering exit of a cyclic-sleep power saving mode, wherein the events include transmission of uplink data; and the OLT may be further configured to send the ONU the command of exiting the cyclic-sleep power saving mechanism or the command of waking up through the extended OAM channel.

The ONU may be further configured to, when detecting that there is no data stream to be received or transmitted in a cyclic power saving activated state, start to apply a cyclic power saving sleep mechanism to save power, set its own state as a cyclic power saving wakened state, and start a timer $T_{cyclic\ power\ saving}$;

enter the cyclic power saving state after the timer $T_{cyclic\ power\ saving}$ expires; and before the timer $T_{cyclic\ power\ saving}$ expires, enter the initial state, and start the timer $T_{initial}$ when the ONU receives a command of exiting the cyclic-sleep power saving mechanism or a command of waking up from the OLT or when the ONU locally detects that there are events of triggering exit of the cyclic-sleep power saving mode, wherein the events include transmission of uplink data.

The ONU may be further configured to, after entering the initial state, receive a command of permitting to enter the cyclic-sleep power saving mechanism, which is sent by the OLT through the extended OAM channel, start the timer $T_{initial}$, and enter the cyclic power saving activated state after the timer $T_{initial}$ expires.

When a power saving mechanism indicated by a power saving mechanism indication in the power saving information is a doze power saving mechanism, the ONU may be further configured to:

enter a doze power saving state, close an uplink optical module, and start a timer $T_{exit}$ according to a doze power saving time allocation that is configured by the OLT or set by the ONU itself;

after the timer $T_{exit}$ expires, exit the doze power saving state, enter a doze power saving wakened state, and open the uplink optical module; and before the timer $T_{exit}$ expires, enter an initial state, and start a timer $T_{initial}$ when the ONU receives a command of exiting a doze sleep power saving mechanism or a command of waking up, which is sent by the OLT through an extended OAM channel, or when the ONU locally detects that there are events of triggering exit of the doze sleep power saving mode, wherein the events include transmission of uplink data; and the OLT may be further configured to send the ONU the command of exiting the doze sleep power saving mechanism or the command of waking up through the extended OAM channel.

The ONU may be further configured to, when detecting that there is no data stream to be received or transmitted in a doze power saving activated state, start to apply the doze sleep power saving mechanism to save power, set its own state as a doze power saving wakened state, start a timer $T_{doze\ power\ saving}$;

enter the doze power saving state after the timer $T_{doze\ power\ saving}$ expires; and before the timer $T_{doze\ power\ saving}$ expires, enter the initial state, and start the timer $T_{initial}$ when the ONU receives a command of exiting the doze sleep power saving mechanism or a command of waking up from the OLT or when the ONU locally detects that there are events of triggering exit of the doze sleep power saving mode, wherein the events include transmission of uplink data.

The ONU may be further configured to, after entering the initial state, receive a command of permitting to enter the doze sleep power saving mechanism, which is sent by the OLT through the extended OAM channel, start the timer $T_{initial}$, and enter the doze power saving activated state after the timer $T_{initial}$ expires.

In the technical solutions provided by the disclosure: passing power saving information between the ONU and the OLT through the extended OAM frame; performing, by the ONU and the OLT, power saving control based on the obtained power saving information by closing/opening an optical module of the ONU. With the method of the disclosure, the optical module of the ONU is closed in time when it is not needed, thereby reducing power consumption of the ONU, and enabling interaction between the ONU and the OLT to meet the requirement for power saving and emission reduction.

The extended OAM frame includes the extended OAM event notification format, or the extended organization dedicated OAM format, or other PDU formats adopting the similar extended OAM.

DETAILED DESCRIPTION

Figure 1:
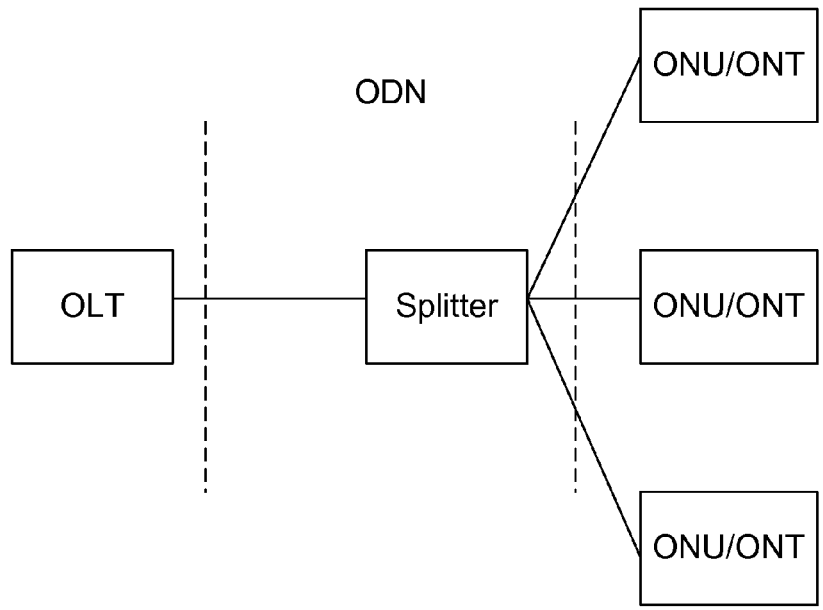
FIG. 1 shows a schematic diagram illustrating network architecture of an existing PON.
Figure 2:
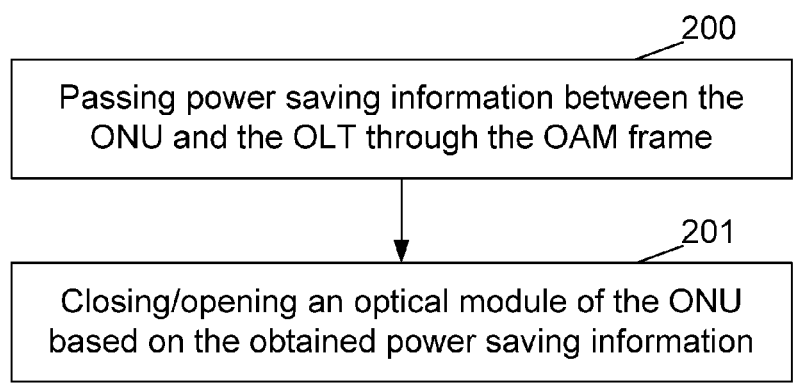
FIG. 2 shows a flowchart illustrating a method for realizing power saving mechanism management between an ONU and an OLT according to the disclosure.

FIG. 2 shows a flowchart illustrating a method for realizing interaction between an ONU and an OLT of the disclosure; as shown in FIG. 2, the method includes the following steps.

Step 200: passing power saving information between the ONU and the OLT through an extended OAM frame.

Those skilled in the art appreciate that the interaction between the ONU and the OLT is realized through the extended OAM frame, and the extended OAM frame is an OAM extended format message defined in the Ethernet protocol 802.3. In the disclosure, the power saving information can be either added in the organization specific information Type-Length-Value (TLV) field which is in the OAM PDU information (INFO OAM PDU) message of the extended OAM frame, or added in the extended OAM event notification message of the extended OAM frame defined in the Ethernet protocol 802.3. Passing power saving information includes the following steps: the ONU uplinks the power saving information to the OLT through a message; and/or, the OLT transmits the power saving information to the ONU through a message.

The power saving information includes a power saving mechanism indication for indicating a power saving mechanism that is entered, and can further include the duration information of a power saving mechanism that is entered.

The power saving mechanism may include doze, fast-sleep, deep-sleep, cyclic-sleep and so on.

Step 201: performing, by the ONU and the OLT, power saving control based on the obtained power saving information, and closing/opening an optical module of the ONU.

In this step, the ONU closes all optical modules (both uplink and downlink optical modules) or part of optical modules (only uplink optical module) when entering the power saving mechanism indicated by the power saving information, so as to achieve the aim of saving power; and the OLT performs some corresponding control processing when the ONU enters the power saving mechanism indicated by the power saving information, such as entering the wait state, inhibiting various alarms caused by a case that the ONU fails to respond to an instruction from the OLT, buffering data stream to be transmitted to the ONU in the downlink direction.

When the power saving mechanism indicated by the power saving mechanism indication in power saving information is the fast-sleep mechanism, at the ONU side, the state machine of the ONU includes the following three states: the normal state, the fast-sleep state and the synchronization state. When being instructed to enter the fast-sleep state, the ONU switches from the normal state to the fast-sleep state, closes uplink and downlink optical modules, and triggers the internal timer T1, wherein, the timing length of the timer T1 is set as the sleep duration included in the power saving mechanism indication; at this point, the ONU responds to neither service requests nor messages from the OLT; after the timer T1 expires, the ONU opens uplink and downlink optical modules, the ONU switches from the fast-sleep state to the synchronization state, and returns to the normal state after receiving a downlink frame of the OLT and completing the synchronization; at the OLT side, after instructing the ONU to enter the fast-sleep state, the OLT inhibits (shields or does not give) various alarms caused by a case that the ONU fails to respond to an instruction from the OLT, and buffers data stream to be transmitted to the ONU in the downlink direction; the OLT starts the internal timer T2, wherein timeout of the timer T2 is set as sleep duration value included in the instruction; after the timer T2 expires, the OLT switches from the sleep wait state to the normal state, and performs normal data communication with the ONU.

When the power saving mechanism indicated by the power saving mechanism indication in power saving information is the deep-sleep mechanism, at the ONU side, the state machine of the ONU includes the following three states: the normal state, the deep-sleep state and the synchronization state. When detecting that there is no uplink and downlink data stream to be communicated with the OLT in the normal state, the ONU notifies the OLT that it enters the deep-sleep state, and indicates duration of deep-sleep; besides, when entering the deep-sleep state, the ONU closes uplink and downlink optical modules, and triggers the internal timer T1 of the ONU, wherein the timing length of the timer T1 is set as the sleep duration in notification; after the timer T1 expires, or when the ONU detects that there is uplink data stream to be transmitted on a user port, the ONU opens uplink and downlink optical modules, and enters the synchronization state; the ONU notifies the OLT that it exits the deep-sleep state after completing downlink frame synchronization with the OLT in the synchronization state and then can perform normal communication; at the OLT side, after receiving notification that the ONU enters the deep-sleep state, the OLT inhibits various alarms caused by a case that the ONU fails to respond to an instruction from the OLT because of entering the deep-sleep state, buffers data stream to be transmitted to the ONU in the downlink direction; after receiving notification from the ONU informing that the ONU exits the deep-sleep state, the OLT performs normal data communication with the ONU.

When the power saving mechanism indicated by the power saving mechanism indication in the power saving information is the doze mechanism, the ONU notifies the OLT when requiring entering and exiting the doze mode; the ONU closes the uplink optical module when entering the doze mode, and opens the uplink optical module when exiting the doze mode; the OLT learns that the ONU requires entering or exiting the doze mode through notification and confirms it.

When the power saving mechanism indicated by the power saving mechanism indication in the power saving information is the cyclic-sleep power saving mechanism, at the ONU side, the state machine of the ONU includes the following four states: the initial state, the cyclic power saving activated state, the cyclic power saving wakened state and the cyclic power saving state. After entering the initial state, the ONU receives the command of permitting to enter the cyclic-sleep power saving mechanism, which is sent by the OLT through the extended OAM channel, starts the timer $T_{initial}$, and enters the cyclic power saving activated state after the timer $T_{initial}$ (which is used for providing enough time for the ONU to remain in the initial state, and whose timing length is subject to ensuring completion of initialization) expires.

Wherein, the ONU in the cyclic power saving activated state has two possible state transitions: (1) when detecting that there is no data stream to be received or transmitted, the ONU can start to apply the cyclic-sleep power saving mechanism to save power, sets its own state as the cyclic power saving wakened state, and starts the timer $T_{cyclic\ power\ saving}$ (which is used for providing enough time for the ONU to remain in the cyclic power saving wakened state); (2) when receiving the command of exiting the cyclic-sleep power saving mechanism or the command of waking up, which is sent by the OLT through the extended OAM channel, the ONU enters the initial state, and starts the timer $T_{initial}$;

the ONU in the cyclic power saving wakened state has two possible state transitions: (1) the ONU enters the cyclic power saving state after the timer $T_{cyclic\ power\ saving}$ expires, closes uplink and downlink optical modules, and starts the timer $T_{exit}$ according to the cyclic power saving time allocation which is configured by the OLT earlier through other management channels or set by the ONU itself; (2) before the timer $T_{cyclic\ power\ saving}$ expires, the ONU enters the initial state and starts the timer $T_{initial}$ when the ONU receives the command of exiting the cyclic-sleep power saving mechanism or the command of waking up, which is sent by the OLT through the extended OAM channel, or when the ONU locally detects that there are events of triggering exit of the cyclic-sleep power saving mode, wherein the events include transmission of uplink data;

the ONU in the cyclic power saving state has two possible state transitions: (1) after the timer $T_{exit}$ (which is used for providing enough time for the ONU to remain in the cyclic power saving state) expires, the ONU exits the cyclic power saving state, enters the cyclic power saving wakened state, and opens uplink and downlink optical modules; (2) before the timer $T_{exit}$ expires, the ONU enters the initial state, and starts the timer $T_{initial}$ when the ONU receives the command of exiting the cyclic-sleep power saving mechanism or the command of waking up, which is sent by the OLT through the extended OAM channel, or when the ONU locally detects that there are events of triggering exit of the cyclic-sleep power saving mode, wherein the events include transmission of uplink data.

When the power saving mechanism indicated by the power saving mechanism indication in the power saving information is the doze sleep power saving mechanism, at the ONU side, the state machine of the ONU includes the following four states: the initial state, the doze power saving activated state, the doze power saving wakened state and the doze power saving state. After entering the initial state, the ONU receives the command of permitting to enter the doze sleep power saving mechanism, which is sent by the OLT through the extended OAM channel, starts the timer $T_{initial}$, and enters the doze power saving activated state after the timer $T_{initial}$ (which is used for providing enough time for the ONU to remain in the initial state, and whose timing length is subject to ensuring completion of initialization) expires.

The ONU in the doze power saving activated state has two possible state transitions: (1) when detecting that there is no data stream to be received or transmitted, the ONU can start to apply the doze sleep power saving mechanism to save power, sets its own state as the doze power saving wakened state, and starts the timer $T_{doze\ power\ saving}$ (which is used for providing enough time for the ONU to remain in the doze power saving wakened state); (2) when receiving the command of exiting the doze sleep power saving mechanism or the command of waking up, which is sent by the OLT through the extended OAM channel, the ONU enters the initial state, and starts the timer $T_{initial}$;

the ONU in the doze power saving wakened state has two possible state transitions: (1) after the timer $T_{doze\ power\ saving}$ expires, the ONU enters the doze power saving state, closes the uplink optical module, and starts the timer $T_{exit}$ according to the doze power saving time allocation which is configured by the OLT earlier through other management channels or set by the ONU itself; (2) before the timer $T_{doze\ power\ saving}$ expires, the ONU enters the initial state, and starts the timer $T_{initial}$ when the ONU receives the command of exiting the doze sleep power saving mechanism or the command of waking up, which is sent by the OLT through the extended OAM channel, or when the ONU locally detects that there are events of triggering exit of the doze sleep power saving mode, wherein the events include transmission of uplink data;

the ONU in the doze power saving state has two possible state transitions: (1) after the timer $T_{exit}$ (which is used for providing enough time for the ONU to remain in the doze power saving state) expires, the ONU exits the doze power saving state, enters the doze power saving wakened state, and opens the uplink optical module; (2) before the timer $T_{exit}$ expires, the ONU enters the initial state, and starts the timer $T_{initial}$ when the ONU receives the command of exiting the doze sleep power saving mechanism or the command of waking up, which is sent by the OLT through the extended OAM channel, or when the ONU locally detects that there are events of triggering exit of the doze sleep power saving mode, wherein the events include transmission of uplink data.

The specific implementation of power saving control aiming at the different power saving mechanisms in Step 201 will be described in subsequent embodiments in detail.

Figure 3:
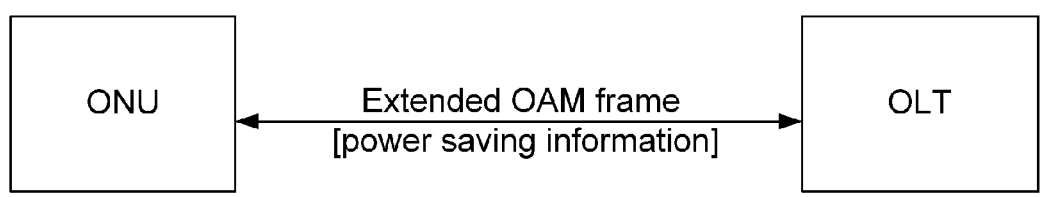
FIG. 3 shows a schematic diagram illustrating structure of a system for realizing power saving mechanism management between an ONU and an OLT according to the disclosure.

Corresponding to the method of the disclosure, a system for realizing interaction between an ONU and an OLT is further provided, which at least includes the ONU and the OLT, as shown in FIG. 3, wherein, the ONU is configured to pass power saving information between the ONU and the OLT through an extended OAM frame, perform power saving control based on the obtained power saving information by closing/opening an optical module;

the OLT is configured to pass power saving information between the OLT and the ONU through the extended OAM frame, and perform power saving control based on the obtained power saving information.

When the power saving mechanism indicated by the power saving mechanism indication in the power saving information is the fast-sleep mechanism, the ONU is configured to:

when being instructed to enter the fast-sleep state, switch from the normal state to the fast-sleep state, close uplink and downlink optical modules, and trigger the timer T1; respond to neither service requests nor messages from the OLT; switch from the fast-sleep state to the synchronization state after the timer T1 expires, open uplink and downlink optical modules, and return to the normal state after receiving a downlink frame of the OLT and completing synchronization;

wherein the timing length of the timer T1 is set as the sleep duration included in the power saving mechanism indication;

the OLT is configured to:

after instructing the ONU to enter the fast-sleep state, inhibit alarms caused by a case that the ONU fails to respond to an instruction from the OLT, and buffer data stream to be transmitted to the ONU in the downlink direction; start the timer T2; and after the timer T2 expires, switch from the sleep wait state to the normal state, and perform normal data communication with the ONU;

wherein timeout of the timer T2 is set as sleep duration value included in the instruction sent by the OLT.

The OLT is further configured to, when being in the normal state, and in the process of performing normal communication with the ONU, receive from a network administrator the command of requiring controlling the ONU to enter the fast-sleep state; or, the MAC of the OLT detects uplink stream of the ONU in real time, and finds that there is no uplink stream in a preset period of time.

When the power saving mechanism indicated by the power saving mechanism indication in the power saving information is the deep-sleep mechanism, the ONU is configured to, when entering the deep-sleep state, close uplink and downlink optical modules, and trigger the timer T1 of the ONU; after the timer T1 expires, or when detecting that there is uplink data stream to be transmitted on a user port, open uplink and downlink optical modules, and enter the synchronization state; notify the OLT that the ONU exits the deep-sleep state after completing downlink frame synchronization with the OLT in the synchronization state;

the OLT is configured to, after receiving notification that the ONU enters the deep-sleep state, inhibit alarms caused by a case that the ONU fails to respond to an instruction from the OLT because of entering the deep-sleep state, buffer data stream to be transmitted to the ONU in the downlink direction, and perform normal data communication with the ONU after receiving notification from the ONU informing that the ONU exits the deep-sleep state.

The ONU is further configured to, when detecting that there is no uplink and downlink data stream to be communicated with the OLT in the normal state, notify the OLT that it enters the deep-sleep state, and indicate duration of deep-sleep; the timing length of the timer T1 is set as the sleep duration in notification; or, the ONU is further configured to, when detecting that there is no uplink and downlink data stream to be communicated with the OLT in the normal state, notify the OLT that it enters the deep-sleep state; the timing length of the timer T1 is set as duration of this deep-sleep, which is preset by the ONU.

When the power saving mechanism indicated by the power saving mechanism indication in the power saving information is the doze mechanism, the ONU is configured to notify the OLT when requiring entering and exiting the doze mode, close the uplink optical module when entering the doze mode, and open uplink optical module when exiting the doze mode;

the OLT is configured to learn that the ONU requires entering or exiting the doze mode through notification and confirm it.

When the power saving mechanism indicated by the power saving mechanism indication in the power saving information is the cyclic-sleep power saving mechanism, the ONU is configured to enter the cyclic power saving state, close uplink and downlink optical modules, and start the timer $T_{exit}$ according to the cyclic power saving time allocation which is configured by the OLT or set by the ONU itself; and the ONU is further configured to, after the timer $T_{exit}$ expires, exit the cyclic power saving state, enter the cyclic power saving wakened state, and open uplink and downlink optical modules; and, before the timer $T_{exit}$ expires, enter the initial state, and start the timer $T_{initial}$ when the ONU receives the command of exiting the cyclic-sleep power saving mechanism or the command of waking up, which is sent by the OLT through the extended OAM channel, or when the ONU locally detects that there are events of triggering exit of the cyclic-sleep power saving mode, wherein the events include transmission of uplink data;

the OLT is configured to send the command of exiting the cyclic-sleep power saving mechanism or the command of waking up to the ONU through the extended OAM channel.

The ONU is further configured to, when detecting that there is no data stream to be received or transmitted in the cyclic power saving activated state, start to apply the cyclic-sleep power saving mechanism to save power, set its own state as the cyclic power saving wakened state, start the timer $T_{periodic\ power\ saving}$, and enter the cyclic power saving state after the timer $T_{periodic\ power\ saving}$ expires; and, before the timer $T_{periodic\ power\ saving}$ expires, enter the initial state, and start the timer $T_{initial}$ when the ONU receives the command of exiting the cyclic-sleep power saving mechanism or the command of waking up from the OLT or when the ONU locally detects that there are events of triggering exit of the cyclic-sleep power saving mode, wherein the events include transmission of uplink data;

the ONU is further configured to, after entering the initial state, receive the command of permitting to enter the cyclic-sleep power saving mechanism, which is sent by the OLT through the extended OAM channel, start the timer $T_{initial}$, and enter the cyclic power saving activated state after the timer $T_{initial}$ expires.

When the power saving mechanism indicated by the power saving mechanism indication in the power saving information is the doze sleep power saving mechanism, the ONU is configured to enter the doze power saving state, close the uplink optical module, and start the timer $T_{exit}$ according to the doze power saving time allocation which is configured by the OLT or set by the ONU itself; the ONU is also configured to, after the timer $T_{exit}$ expires, exit the doze power saving state, enter the doze power saving wakened state, and open the uplink optical module; and, before the timer $T_{exit}$ expires, enter the initial state, and start the timer $T_{initial}$ when the ONU receives the command of exiting the doze sleep power saving mechanism or the command of waking up, which is sent by the OLT through the extended OAM channel, or when the ONU locally detects that there are events of triggering exit of the doze sleep power saving mode, wherein the events include transmission of uplink data;

the OLT is configured to send the command of exiting the doze sleep power saving mechanism or the command of waking up to the ONU through the extended OAM channel.

The ONU is further configured to, when detecting that there is no data stream to be received or transmitted in the doze power saving activated state, start to apply the doze sleep power saving mechanism to save power, set its own state as the doze power saving wakened state, start the timer $T_{doze\ power\ saving}$; and enter the doze power saving state after the timer $T_{doze\ power\ saving}$ expires; and the ONU is further configured to, before the timer $T_{doze\ power\ saving}$ expires, enter the initial state, and start the timer $T_{initial}$ when the ONU receives the command of exiting the doze sleep power saving mechanism or the command of waking up from the OLT or when the ONU locally detects that there are events of triggering the exit of the doze sleep power saving mode, wherein the events include transmission of uplink data.

The ONU is further configured to, after entering the initial state, receive the command of permitting to enter the doze sleep power saving mechanism, which is sent by the OLT through the extended OAM channel, start the timer $T_{initial}$, and enter the doze power saving activated state after the timer $T_{initial}$ expires.

The technical solutions of the disclosure are described below with reference to embodiments in detail.

The first embodiment: performing power saving control of the fast-sleep power saving mechanism by utilizing the extended OAM frame.

Supposing the OLT receives, in the normal state and in the process of performing normal communication with the ONU, the command of requiring controlling the ONU to enter the fast-sleep state from the network administrator; or, the OLT is required to enter the fast-sleep state, when the MAC of the OLT finds that there is no uplink stream in a preset period of time after detecting the uplink stream of the ONU in real time. Wherein, the specific implementation for detecting the uplink stream in real-time belongs to the prior art, and is out of the protection scope of the disclosure, which is not intended to limit the protection scope of the disclosure.

First, the OLT sends the ONU an extended OAM message for notifying entering of fast-sleep (which is also called the fast-sleep (F-SLEEP) notification message), as shown in Table 1; and the OLT enters the sleep wait state S2 after sending the F-SLEEP notification message, inhibits (shields or does not give) various alarms caused by a case that the ONU fails to respond to an instruction from the OLT, and buffers data stream to be transmitted to the ONU in the downlink direction; starts the internal timer T2, wherein timeout of the timer T2 is set as sleep duration value (namely, sleep duration) included in the message.

TABLE 1

Destination address
Source address
Length/type=0x8809 (indicating slow protocol)
Subtype=0x03 (indicating OAM)
State indication=0x07 (indicating power saving event)
Code=0xFE (indicating organization specific information)
OUI (indicating organization specific identity)
Extended action code=0x03 (used for the OLT to configure extended attribute/operation to the ONU)
Branch=0xC9 (indicating extended operation)
Leaf=0x0090 (indicating the F-SLEEP notification)
Variable Width=0x04 (indicating length of following fields)
Sleep duration, indicating duration that the ONU keeps in the fast-sleep state, and the unit is microsecond (us)
Frame check sequence (FCS)

As shown in Table 1, the F-SLEEP notification message includes an indication of entering fast-sleep (e.g., Leaf=0x0090 in Table 1; this is just for example, and value can be changed so long as the ONU and the OLT make an agreement), and a sleep duration value (e.g., the sleep duration in Table 1).

Figure 4:
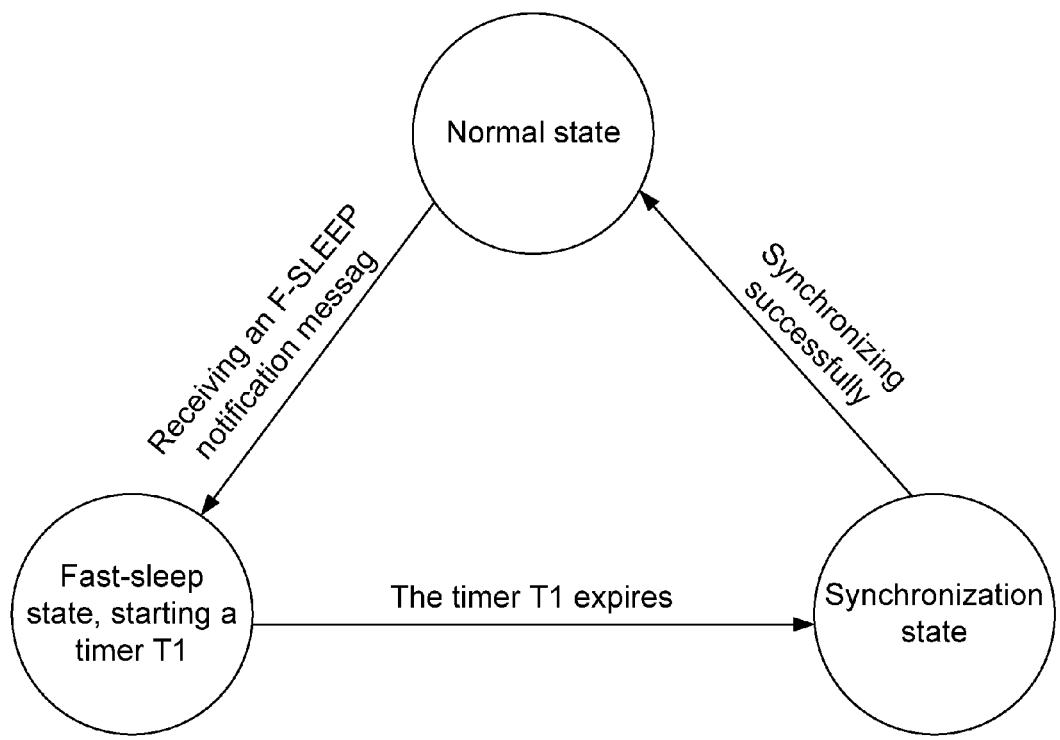
FIG. 4 shows a transition diagram of a state machine of the ONU in the fast-sleep power saving mechanism according to the first embodiment of the disclosure.
Figure 5:
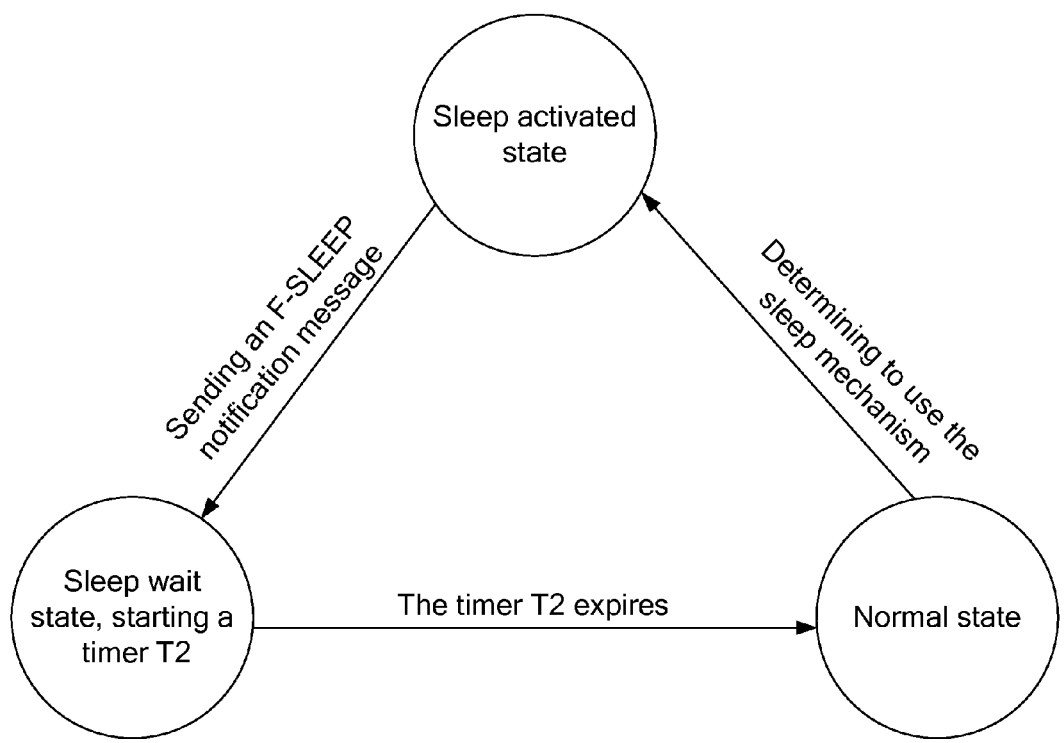
FIG. 5 shows a transition diagram of a state machine of the OLT in the fast-sleep power saving mechanism according to the first embodiment of the disclosure.

Then, at the ONU side, after receiving the F-SLEEP notification message, as shown in FIG. 4, the ONU switches from the normal state to the fast-sleep state, closes uplink and downlink optical modules, and triggers the internal timer T1, wherein timeout value of the timer T1 is set as the sleep duration included in the received F-SLEEP notification message; at this point, the ONU responds to neither service requests nor messages from the OLT; after the timer T1 expires, the ONU switches from the fast-sleep state to the synchronization state, opens uplink and downlink optical modules, receives a downlink frame of the OLT and executes synchronization; the ONU returns to the normal state after completing downlink frame synchronization with the OLT in the synchronization state;

at the OLT side, after the timer T2 expires, the OLT switches from the sleep wait state to the normal state, and performs normal data communication with the ONU, as shown in FIG. 5; FIG. 5 shows a transition diagram of a state machine of the OLT in the fast-sleep power saving mechanism according to the first embodiment of the disclosure.

In the first embodiment, when the ONU enters the fast-sleep state, closing of uplink and downlink optical modules achieves the aim of saving power; at this point, when uplink and downlink data streams recover, they can be buffered first, and then data is transmitted after the ONU completes synchronization and returns to the normal state.

The OLT mainly controls time of activated cycle (in which the ONU is in the normal operating state)/sleep cycle (in which optical modules are closed) of the ONU. The disclosure can also use a simpler method to perform controlling, for example, periodically opening the optical module for N milliseconds (ms), and then periodically closing the optical module for M ms, wherein N is usually greater than M; besides, detection for data stream on the ONU can also be combined; when there is no data stream detected, closing the optical module for M ms, then opening the optical module, and then performing detection again. Downlink data stream in the sleep cycle is buffered by the OLT, and uplink data stream is buffered by the ONU.

The second embodiment: performing power saving control of the deep-sleep power saving mechanism by utilizing the extended OAM frame, and directly performing synchronization after waking up from deep-sleep.

Supposing the ONU detects that there is no uplink and downlink data stream to be communicated with the OLT in the normal state. The ONU detecting, in the normal state, whether there is uplink and downlink data stream belongs to the technology well known in the art, and is out of the protection scope of the disclosure, and the specific implementation thereof is not intended to limit the protection scope of the disclosure.

First, the ONU sends the OLT the extended OAM message for notifying entering of deep-sleep (which is also called the deep-sleep (D-SLEEP) notification message), as shown in Table 2-1 or Table 2-2, so as to notify the OLT that it will enter the deep-sleep state, wherein the D-SLEEP notification message includes an indication of entering deep-sleep (e.g., the deep-sleep action notification parameter Leaf=0x0090 in Table 2-1 and Table 2-2; this is just for example, and value can be changed so long as the ONU and the OLT make an agreement), and deep-sleep duration (e.g., the sleep duration in Table 2-1 and Table 2-2); and the ONU enters the deep-sleep state.

TABLE 2-1

Destination address
Source address
Length/type=0x8809 (indicating slow protocol)
Subtype=0x03 (indicating OAM)
State indication=0x07 (indicating power saving event)
Code=0xFE (indicating organization specific information)
OUI (indicating organization specific identity)
Extended action code=0x0B (used for notifying the power saving mechanism)
Branch=0xC9 (indicating extended operation)
Leaf=0x0090 (indicating the D-SLEEP notification message of the ONU)
Variable Width=0x05 (indicating length of following fields)
Deep-sleep action notification=0x01, indicating that the ONU enters deep-sleep
Sleep duration, indicating it is valid when the deep-sleep action notification is 0x01
FCS

TABLE 2-2

Figure 6:
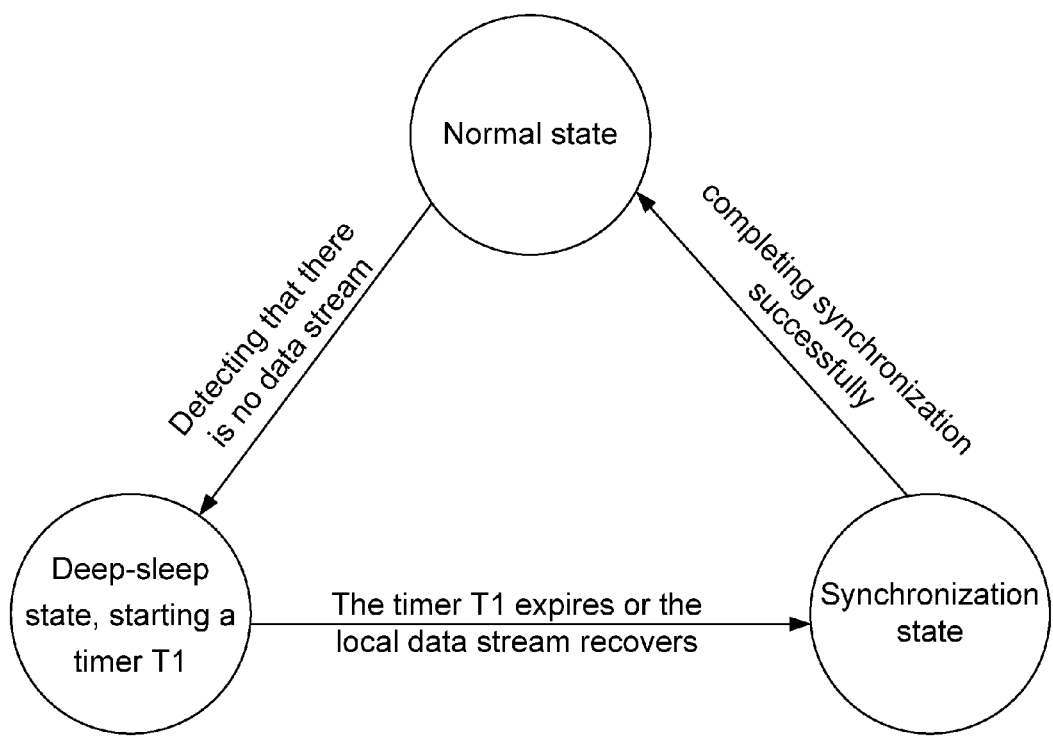
FIG. 6 shows a transition diagram of a state machine of the ONU in the deep-sleep power saving mechanism according to the second embodiment of the disclosure.

Destination address
Source address
Length/type=0x8809 (indicating slow protocol)
Subtype=0x03 (indicating OAM)
State indication=0x07 (indicating power saving event)
Code=0xFE (indicating organization specific information)
OUI (indicating organization specific identity)
Extended action code=0x0B (used for notifying the power saving mechanism)
Type of power saving mechanism=0x01 (indicating the deep-sleep mechanism D-SLEEP)
Deep-sleep action notification=0x01, indicating that the ONU enters deep-sleep
Sleep duration, indicating it is valid when the deep-sleep action notification is 0x01
FCS Then, at the ONU side,
as shown in FIG. 6, when entering the deep-sleep state, the ONU closes uplink and downlink optical modules, and triggers the internal timer T1 of the ONU, wherein the timing length of the timer T1 is set as sleep duration in the D-SLEEP notification message; after the internal timer T1 of the ONU expires, or when the ONU detects that there is uplink data stream to be transmitted on the user port, the ONU opens uplink and downlink optical modules, receives the downlink frame of the OLT, and enters the synchronization state; after completing downlink frame synchronization with the OLT in the synchronization state, the ONU sends the OLT the extended OAM message for notifying exit of deep-sleep (which is also called the notification message of exiting D-SLEEP), as shown in Table 3-1 or Table 3-2, so as to notify the OLT that it will exit the deep-sleep state and can perform normal communication;

TABLE 3-1

Destination address
Source address
Length/type=0x8809 (indicating slow protocol)
Subtype=0x03 (indicating OAM)
State indication=0x07 (indicating power saving event)
Code=0xFE (indicating organization specific information)
OUI (indicating organization specific identity)
Extended action code=0x0B (used for notifying the power saving mechanism)

TABLE 3-1-continued

Branch=0xC9 (indicating extended operation)
Leaf=0x0090 (indicating the D-SLEEP notification message of the ONU)
Variable Width=0x05
Deep-sleep action notification=0x00, indicating that the ONU exits deep-sleep
Sleep duration, indicating it is invalid when the deep-sleep action notification is 0x00
FCS

TABLE 3-2

Destination address
Source address
Length/type=0x8809 (indicating slow protocol)
Subtype=0x03 (indicating OAM)
State indication=0x07 (indicating power saving event)
Code=0xFE (indicating organization specific information)
OUI (indicating organization specific identity)
Extended action code=0x0B (used for notifying the power saving mechanism)
Type of power saving mechanism=0x01 (indicating it is the deep-sleep mechanism D-SLEEP)
Deep-sleep action notification=0x00, indicating that the ONU exits deep-sleep
Sleep duration, indicating it is invalid when the deep-sleep action notification is 0x00
FCS at the OLT side,
after receiving the D-SLEEP notification message, the OLT inhibits various alarms caused by a case that the ONU fails to respond to the instruction from the OLT because of entering deep-sleep, and buffers data stream to be transmitted to the ONU in the downlink direction; after receiving the notification message of exiting D-SLEEP sent by the ONU, the OLT performs normal data communication with the ONU.

The third embodiment: performing power saving control of the deep-sleep power saving mechanism by utilizing the extended OAM frame, and waiting for some time to perform synchronization after waking up from deep-sleep.

Supposing the ONU detects that there is no uplink and downlink data stream to be communicated with the OLT in the normal state. The ONU detecting, in the normal state, whether there is uplink and downlink data stream belongs to the technology well known in the art, and is out of the protection scope of the disclosure, and the specific implementation thereof is not intended to limit the protection scope of the disclosure.

First, the ONU sends the OLT the extended OAM message for notifying entering of deep-sleep (which is also called the deep-sleep (D-SLEEP) notification message), as shown in Table 4-1 or Table 4-2, so as to notify the OLT that it will enter the deep-sleep state; the D-SLEEP notification message includes an indication of entering deep-sleep (e.g., deep-sleep action notification=0x01 in Table 4-1 and Table 4-2); and the ONU enters the deep-sleep state.

TABLE 4-1

Destination address
Source address
Length/type=0x8809 (indicating slow protocol)
Subtype=0x03 (indicating OAM)
State indication=0x07 (indicating power saving event)
Code=0xFE (indicating organization specific information)
OUI (indicating organization specific identity)

TABLE 4-1-continued

Extended action code=0x0B (used for notifying the power saving mechanism)
Branch=0xC9 (indicating extended operation)
Leaf=0x0090 (indicating the D-SLEEP notification message of the ONU)
Variable Width=0x01
Deep-sleep action notification=0x01, indicating that the ONU enters deep-sleep
FCS

TABLE 4-2

Destination address
Source address
Length/type=0x8809 (indicating slow protocol)
Subtype=0x03 (indicating OAM)
State indication=0x07 (indicating power saving event)
Code=0xFE (indicating organization specific information)
OUI (indicating organization specific identity)
Extended action code=0x0B (used for notifying the power saving mechanism)
Type of power saving mechanism=0x01 (indicating the deep-sleep mechanism D-SLEEP)
Deep-sleep action notification=0x01, indicating that the ONU enters deep-sleep
FCS Then, at the ONU side, when entering the deep-sleep state, the ONU closes uplink and downlink optical modules, triggers the internal timer T1 of the ONU, wherein the timing length of the timer T1 is set as duration of this deep-sleep, which is preset by the ONU; when detecting that there is no uplink data stream to be transmitted after the internal timer T1 of the ONU expires, the ONU resets the timer T1, and keeping waiting; when detecting that there is uplink data stream to be transmitted, the ONU opens uplink and downlink optical modules, receives the downlink frame of the OLT, and enters the synchronization state; after completing downlink frame synchronization with the OLT in the synchronization state, the ONU sends the OLT the extended OAM message for notifying exit of deep-sleep (whish is also called notification message of exiting D-SLEEP), as shown in Table 5-1 or Table 5-2, so as to notify the OLT that it will exit the deep-sleep state and can perform normal communication:

TABLE 5-1

Destination address
Source address
Length/type=0x8809 (indicating slow protocol)
Subtype=0x03 (indicating OAM)
State indication=0x07 (indicating power saving event)
Code=0xFE (indicating organization specific information)
OUI (indicating organization specific identity)
Extended action code=0x0B (used for notifying the power saving mechanism)
Branch=0xC9 (indicating extended operation)
Leaf=0x0090 (indicating the D-SLEEP notification message of the ONU)
Variable Width=0x01
Deep-sleep action notification=0x00, indicating that the ONU exits deep-sleep
FCS

TABLE 5-2

Destination address
Source address

TABLE 5-2-continued

Length/type=0x8809 (indicating slow protocol)
Subtype=0x03 (indicating OAM)
State indication=0x07 (indicating power saving event)
Code=0xFE (indicating organization specific information)
OUI (indicating organization specific identity)
Extended action code=0x0B (used for notifying the power saving mechanism)
Type of power saving mechanism=0x01 (indicating the deep-sleep mechanism D-SLEEP)
Deep-sleep action notification=0x00, indicating that the ONU exits deep-sleep
FCS at the OLT side, after receiving the D-SLEEP notification message, the OLT inhibits various alarms caused by a case that the ONU fails to respond to the instruction from the OLT because of entering deep-sleep, and buffers data stream to be transmitted to the ONU in the downlink direction; after receiving the notification message of exiting D-SLEEP sent by the ONU, the OLT performs normal data communication with the ONU.

In the second embodiment and the third embodiment, the deep-sleep power saving mechanism is mainly performed through controlling entering and exit of deep-sleep state by the ONU itself, and closes the optical module during deep-sleep, thereby achieving the aim of saving power. It should be noted that, when the optical module is closed, only a minimal activation checking function or a timer is kept running; when there are service requests detected, such as off-hook, data request, or after a local timer expires, the ONU is wakened up to enter the normal state.

In addition, tolerance time can be set according to sleep duration reported by the ONU; if an uplink signal of the ONU has not been received within the tolerance time, the ONU is considered to be powered off. In other words, supposing the ONU indicates that sleep duration is 100 ms when reporting entering of sleep, the OLT can set duration as 120 ms; normally, 100 ms later, the ONU can respond to instruction from the OLT after waking up; if the ONU still fails to respond at the end of 120 ms, the ONU is considered to be powered off.

Note that, after the ONU is wakened by the OLT from the deep-sleep state that is kept in a preset enough period of time, the ONU needs to range again; the specific implementation of ranging is unrelated to the disclosure, which belongs to the prior art, and specific implementation thereof is not intended to limit the protection scope of the disclosure.

The fourth embodiment: performing power saving control of the doze power saving mechanism by utilizing the extended OAM frame.

Supposing that the ONU is in the normal operating state and has uplink and downlink data streams to be transmitted, the OLT performs configuration to make the ONU operate in a doze operating mode.

First, stopping transmission of uplink stream of the ONU; the ONU will send a request of entering a dormant state in the uplink, wherein the request message is realized through the extended OAM message for notifying entering of the doze mode (which is also called notification message of entering doze mode), as shown in Table 6-1 or Table 6-2.

TABLE 6-1

Destination address
Source address
Length/type=0x8809 (indicating slow protocol)
Subtype=0x03 (indicating OAM)

TABLE 6-1-continued

State indication=0x07 (indicating power saving event)
Code=0xFE (indicating organization specific information)
OUI (indicating organization specific identity)
Extended action code=0x0B (used for notifying the power saving mechanism)
Branch=0xC9 (indicating extended operation)
Leaf=0x0091 (Dozing, dormant state request message of the ONU in the doze mode)
Variable Width=0x02
Doze action notification=0x00, indicating that the ONU requests entering the doze state
FCS

TABLE 6-2

Destination address
Source address
Length/type=0x8809 (indicating slow protocol)
Subtype=0x03 (indicating OAM)
State indication=0x07 (indicating power saving event)
Code=0xFE (indicating organization specific information)
OUI (indicating organization specific identity)
Extended action code=0x0B (used for notifying the power saving mechanism)
Type of power saving mechanism=0x02 (indicating doze sleep mechanism Doze-SLEEP)
Deep-sleep action notification=0x01, indicating that the ONU requests entering the doze sleep mode
FCS Then, at the ONU side, after entering the doze state, the ONU closes the uplink optical module; the OLT periodically sends a heartbeat message to detect whether the ONU is in the permanent doze state (namely, offline), wherein the heartbeat message is also realized through the extended OAM message; the heartbeat message is shown in Table 7;

TABLE 7

Destination address
Source address
Length/type=0x8809 (indicating slow protocol)
Subtype=0x03 (indicating OAM)
State indication=0x07 (indicating power saving event)
Code=0xFE (indicating organization specific information)
OUI (indicating organization specific identity)
Extended action code=0x0B (used for notifying the power saving mechanism)
Branch=0xC7 (indicating extended operation, executing Get command)
Leaf=0x0001 (indicating ONUID, namely identity information of the ONU)
Variable Width=0x02
Query of current power saving state of the ONU
FCS when the ONU is not in the permanent doze state (namely, offline), it will instantly enter the wakened state and respond to the heartbeat message sent by the OLT, and enter the dormant state again after responding. When the ONU fails to respond to the heartbeat message sent by the OLT in a certain period of time, the ONU is considered to be offline and enter an offline state; when having uplink data stream again, the ONU, through the extended OAM message for notifying exit of the doze mode (which is also called the notification message of exiting a doze mode) as shown in Table 8-1 or Table 8-2, opens the uplink optical module and notifies the OLT that it needs to be wakened again.

TABLE 8-1

Destination address
Source address
Length/type=0x8809 (indicating slow protocol)
Subtype=0x03 (indicating OAM)
State indication=0x07 (indicating power saving event)
Code=0xFE (indicating organization specific information)
OUI (indicating organization specific identity)
Extended action code=0x0B (used for notifying the power saving mechanism)
Branch=0xC9 (indicating extended operation)
Leaf=0x0091 (Dozing, dormant state request message of the ONU in the doze mode)
Variable Width=0x02 (indicating length of following fields, and the unit is Byte)
Doze action notification=0x02, indicating that the ONU has exited the doze state
FCS

TABLE 8-2

Destination address
Source address
Length/type=0x8809 (indicating slow protocol)
Subtype=0x03 (indicating OAM)
State indication=0x07 (indicating power saving event)
Code=0xFE (indicating organization specific information)
OUI (indicating organization specific identity)
Extended action code=0x0B (used for notifying the power saving mechanism)
Type of power saving mechanism=0x02 (indicating the doze sleep mechanism Doze-SLEEP)
Deep-sleep action notification=0x02, indicating that the ONU has exited the doze state
FCS At the OLT side, after receiving the notification message of entering the doze mode, the OLT confirms that the ONU can operate in the doze mode at present and meets condition of entering the doze state, and then sends a confirmation message of permitting to enter the doze state through the extended OAM message, wherein the confirmation message is shown in Table 9. Note that, the specific implementation method of how to meet condition of entering the doze state is out of the protection scope of the disclosure, in practical application, the OLT controls whether the ONU enters the power saving state.

TABLE 9

Destination address
Source address
Length/type=0x8809 (indicating slow protocol)
Subtype=0x03 (indicating OAM)
State indication=0x07 (indicating power saving event)
Code=0xFE (indicating organization specific information)
OUI (indicating organization specific identity)
Extended action code=0x0B (used for notifying the power saving mechanism)
Branch=0xC9 (indicating extended operation)
Leaf=0x0092 (indicating response message of the OLT sent to the ONU in the doze mode)
Variable Width=0x02
Response of the OLT to dormant state request of the ONU=0x00, indicating that the ONU is permitted to enter the dormant state
FCS After receiving the notification message of exiting a doze mode, the OLT confirms that the ONU is in the normal state currently.

In the doze mode, through the extended OAM message of the disclosure, the operating state of the ONU is detected effectively, and responding is made to the specific operating state request of the ONU, thereby ensuring normal switch of the ONU among these states in the doze mode.

The fifth embodiment: performing power saving control for managing the ONU to enter the cyclic power saving mode (namely, the cyclic-sleep power saving mode) by utilizing the extended OAM frame.

Figure 7:
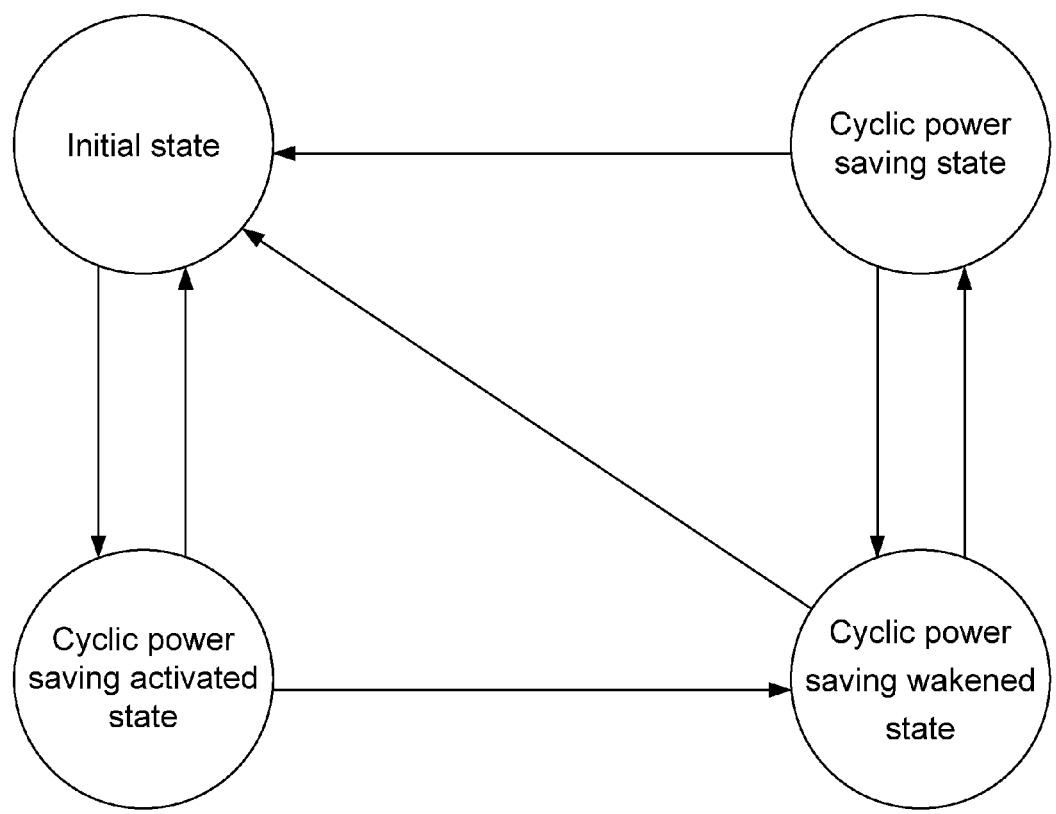
FIG. 7 shows a transition diagram of a state machine of the ONU in the cyclic power saving mechanism according to the fifth embodiment of the disclosure.

As shown in FIG. 7, supposing the ONU receives, after entering the initial state, the command of permitting to enter the cyclic-sleep power saving mechanism, which is sent by the OLT through the extended OAM channel, the ONU starts the timer $T_{initial}$, and enters the cyclic power saving activated state after the timer $T_{initial}$ (which is used for providing enough time for the ONU to remain in the initial state, and whose timing length is subject to ensuring completion of initialization) expires.

When being in the cyclic power saving activated state, as shown in FIG. 7, the ONU has two possible state transitions:

1. the ONU sets its own state as the cyclic power saving wakened state, and starts the timer $T_{periodic\ power\ saving}$, when detecting that there is no data to be transmitted and received and being capable of starting to apply the cyclic-sleep power saving mechanism to save power;

2. the ONU enters the initial state, and starts the timer $T_{initial}$, when receiving the command of exiting the cyclic-sleep power saving mechanism shown in Table 10, or the command of waking up shown in Table 11, which is sent by the OLT through the extended OAM channel;

TABLE 10

Destination address
Source address
Length/type=0x8809 (indicating slow protocol)
Subtype=0x03 (indicating OAM)
State indication=0x07 (indicating power saving event)
Code=0xFE (indicating organization specific information)
OUI (indicating organization specific identity)
Extended action code=0x0B (used for notifying the power saving mechanism)
Branch=0xC9 (indicating extended operation)
Leaf=0x0090 (ONU Cycle-Control, indicating cyclic power saving mode control command)
Variable Width=0x01 (indicating length of fields)
Power saving mode control=0x02, exiting the cyclic-sleep power saving mechanism, and the ONU cannot use the mode
FCS

TABLE 11

Destination address
Source address
Length/type=0x8809 (indicating slow protocol)
Subtype=0x03 (indicating OAM)
State indication=0x07 (indicating power saving event)
Code=0xFE (indicating organization specific information)
OUI (indicating organization specific identity)
Extended action code=0x0B (used for notifying the power saving mechanism)
Branch=0xC9 (indicating extended operation)
Leaf=0x0090 (ONU Cycle-Control, indicating cyclic power saving mode control command)
Variable Width=0x01 (indicating length of fields)
Power saving mode control=0x03, waking up from the cyclic-sleep power saving mode
FCS when being in the cyclic power saving wakened state, as shown in FIG. 7, the ONU has two possible state transitions:

1. after the timer $T_{periodic\ power\ saving}$ expires, the ONU enters the cyclic power saving state, closes uplink and downlink optical modules, and starts the timer $T_{exit}$ according to the cyclic power saving time allocation which is configured by the OLT earlier through other management channels or set by the ONU itself;

2. before the timer $T_{periodic\ power\ saving}$ expires, the ONU enters the initial state, and starts the timer $T_{initial}$ when the ONU receives the command of exiting the cyclic-sleep power saving mechanism (as shown in Table 10) or the command of waking up (as shown in Table 11), which is sent by the OLT through the extended OAM channel, or when the ONU locally detects that there are events of triggering exit of the cyclic-sleep power saving mode, wherein the events include transmission of uplink data;

when being in the cyclic power saving state, as shown in FIG. 7, the ONU has two possible state transitions:

1. after the timer $T_{exit}$ expires, the ONU exits the cyclic power saving state, opens uplink and downlink optical modules, and enters the cyclic power saving wakened state;

2. before the timer $T_{exit}$ expires, the ONU enters the initial state, and starts the timer $T_{initial}$ when the ONU locally detects that there are events of triggering exit of the cyclic-sleep power saving mode, wherein the events include transmission of uplink data;

after entering the initial state, the ONU receives the command of permitting to enter the cyclic-sleep power saving mechanism, which is sent by the OLT through the extended OAM channel, as shown in Table 12, and enters the cyclic power saving activated state after the timer $T_{initial}$ expires.

TABLE 12

Destination address
Source address
Length/type=0x8809 (indicating slow protocol)
Subtype=0x03 (indicating OAM)
State indication=0x07 (indicating power saving event)
Code=0xFE (indicating organization specific information)
OUI (indicating organization specific identity)
Extended action code=0x0B (used for notifying the power saving mechanism)
Branch=0xC9 (indicating extended operation)
Leaf=0x0090 (ONU Cycle-Control, indicating cyclic power saving mode control command)
Variable Width=0x01
Doze mode control=0x01, permitting to enter the cyclic power saving mode
FCS It can be seen from the fifth embodiment that the normal switch of the ONU among these states is effectively driven and controlled through the extended OAM message in the cyclic power saving mode. Note that, the implementation of the control mode and instruction mode in the embodiment can also be applied to the doze power saving mechanism, and the only difference between the cyclic power saving state and the doze power saving state is that: in the cyclic power saving state, the ONU receives neither messages nor instructions from the OLT, but can only exit the cyclic power saving mode and switch to the initial state when locally detecting that there are triggering events, such as transmission of uplink data, or timed exit; however, in the doze power saving state, the ONU can also switch to the initial state by accepting the instruction of exiting or terminating, which is sent by the OLT, except exiting the doze power saving mode when locally detecting that there are triggering events, such as transmission of uplink data, or timed exit; the specific format of the instruction can refer to Table 9, but the content is only set as the instruction of exiting or terminating, referring to the sixth embodiment; other processes are identical.

The sixth embodiment: performing power saving control or management for managing the ONU to enter the doze power saving mode by utilizing the extended OAM frame.

Figure 8:
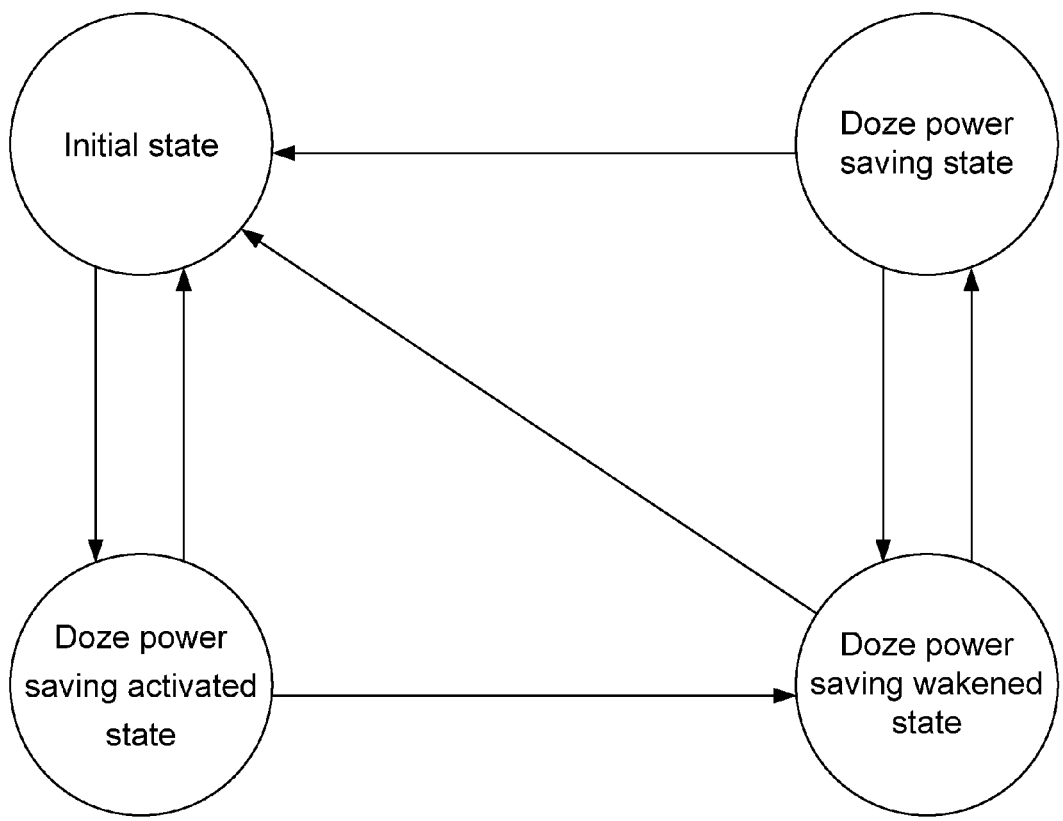
FIG. 8 shows a transition diagram of a state machine of the ONU in the doze power saving mechanism according to the sixth embodiment of the disclosure.

As shown in FIG. 8, supposing the ONU receives, after entering the initial state, the command of permitting to enter the doze power saving mechanism, which is sent by the OLT through the extended OAM channel, the ONU starts the timer $T_{initial}$, and enters the doze power saving activated state after the timer $T_{initial}$ (which is used for providing enough time for the ONU to remain in the initial state, and whose timing length is subject to ensuring completion of initialization) expires.

When being in the doze power saving activated state, as shown in FIG. 8, the ONU has two possible state transitions:

1. the ONU sets its own state as the doze power saving wakened state, and starts the timer $T_{doze\ power\ saving}$, when detecting that there is no data to be transmitted and being capable of starting to apply the doze power saving mechanism to save power;

2. the ONU enters the initial state, and starts the timer $T_{initial}$, when receiving the command of exiting the doze power saving mechanism shown in Table 10, or the command of waking up shown in Table 11, which is sent by the OLT through the extended OAM channel;

when being in the doze power saving wakened state, as shown in FIG. 8, the ONU has two possible state transitions:

1. after the timer $T_{doze\ power\ saving}$ expires, the ONU enters the doze power saving state, closes the uplink optical modules, and starts the timer $T_{exit}$ according to the cyclic power saving time allocation which is configured by the OLT earlier through other management channels or set by the ONU itself;

2. before the timer $T_{doze\ power\ saving}$ expires, the ONU enters the initial state, and starts the timer $T_{initial}$ when the ONU receives the command of exiting the doze power saving mechanism (as shown in Table 12) or the command of waking up (as shown in Table 13), which is sent by the OLT through the extended OAM channel, or when the ONU locally detects that there are events of triggering exit of the doze power saving mode, wherein the events include transmission of uplink data;

TABLE 12

Destination address
Source address
Length/type=0x8809 (indicating slow protocol)
Subtype=0x03 (indicating OAM)
State indication=0x07 (indicating power saving event)
Code=0xFE (indicating organization specific information)
OUI (indicating organization specific identity)
Extended action code=0x0B (used for notifying the power saving mechanism)
Branch=0xC9 (indicating extended operation)
Leaf=0x0090 (ONU Dozing-Control, indicating doze power saving mode control command)
Variable Width=0x01 (indicating length of fields)
Doze mode control=0x02, exiting doze sleep, and the ONU cannot use the mode
FCS

TABLE 13

Destination address
Source address
Length/type=0x8809 (indicating slow protocol)
Subtype=0x03 (indicating OAM)
State indication=0x07 (indicating power saving event)
Code=0xFE (indicating organization specific information)
OUI (indicating organization specific identity)

TABLE 13-continued

Extended action code=0x0B (used for notifying the power saving mechanism)
Branch=0xC9 (indicating extended operation)
Leaf=0x0090 (ONU Cycle-Control, indicating doze power saving mode control command)
Variable Width=0x01 (indicating length of fields)
Doze mode control=0x03, waking up from doze sleep
FCS when being in the doze power saving state, as shown in FIG. 8, the ONU has two possible state transitions:

1. after the timer $T_{exit}$ expires, the ONU exits the doze power saving state, opens the uplink optical module, and enters the doze power saving wakened state;

2. before the timer $T_{exit}$ expires, the ONU enters the initial state, and starts the timer $T_{initial}$ when the ONU receives the command of exiting the doze power saving mechanism (as shown in Table 12) or the command of waking up (as shown in Table 13), which is sent by the OLT through the extended OAM channel, or when the ONU locally detects that there are events of triggering exit of the doze power saving mode, wherein the events include transmission of uplink data;

after entering the initial state, the ONU receives the command of permitting to enter the doze power saving mechanism, which is sent by the OLT through the extended OAM channel, as shown in Table 14, and enters the doze power saving activated state after the timer $T_{initial}$ expires.

TABLE 14

Destination address
Source address
Length/type=0x8809 (indicating slow protocol)
Subtype=0x03 (indicating OAM)
State indication=0x07 (indicating power saving event)
Code=0xFE (indicating organization specific information)
OUI (indicating organization specific identity)
Extended action code=0x0B (used for notifying the power saving mechanism)
Branch=0xC9 (indicating extended operation)
Leaf=0x0090 (ONU Dozing-Control, indicating doze power saving mode control command)
Variable Width=0x01
Doze mode control=0x01, permitting to enter the doze power saving mode
FCS The above is only the preferred embodiments of the disclosure and not intended to limit the protection scope of the disclosure; any modifications, equivalent replacements, improvements and the like within the spirit and principle of the disclosure shall fall within the protection scope of the disclosure.

The invention claimed is:

1. A method for realizing power saving mechanism management between an Optical Network Unit (ONU) and an Optical Line Terminal (OLT), comprising:
   passing power saving information between the ONU and the OLT through an extended Operation Administration and Maintenance (OAM) frame; and
   closing/opening an optical module of the ONU based on the obtained power saving information,
   wherein the power saving information is included in an organization specific information Type-Length-Value (TLV) field that is in an OAM Protocol Data Unit (PDU) information message of the extended OAM frame; or
   the power saving information is included in an extended OAM event notification message of the extended OAM frame; or the power saving information is included in an extended OAM PDU format of the extended OAM frame;

wherein, when a power saving mechanism indicated by a power saving mechanism indication in the power saving information is a fast-sleep mechanism, the ONU and the OLT performing power saving control based on the obtained power saving information by closing/opening the optical module of the ONU comprises:

the ONU switching from a normal state to a fast-sleep state when the ONU is instructed to enter the fast-sleep state, closing uplink and downlink optical modules, and triggering a timer T1, wherein a timing length of the timer T1 is set as sleep duration included in the power saving mechanism indication; the ONU responding to neither service requests nor messages from the OLT; after the timer T1 expires, the ONU opening the uplink and downlink optical modules, switching from the fast-sleep state to a synchronization state, and returning to the normal state after receiving a downlink frame of the OLT and completing synchronization;

after the ONU is instructed by the OLT to enter the fast-sleep state, the OLT inhibiting alarms caused by a case that the ONU fails to respond to an instruction from the OLT, and buffering data stream to be transmitted to the ONU in a downlink direction; the OLT starting a timer T2, wherein timeout of the timer T2 is set as a sleep duration value included in an instruction sent by the OLT; after the timer T2 expires, the OLT switching from a sleep wait state to the normal state, and performing normal data communication with the ONU;

when a power saving mechanism indicated by a power saving mechanism indication in the power saving information is a deep-sleep mechanism, the ONU and the OLT performing power saving control based on the obtained power saving information by closing/opening the optical module of the ONU comprises:

closing, by the ONU, uplink and downlink optical modules when entering a deep-sleep state, and triggering a timer T1 of the ONU; after the timer T1 expires, or when the ONU detects that there is uplink data stream to be transmitted on a user port, opening, by the ONU, uplink and downlink optical modules, and entering a synchronization state; notifying, by the ONU, the OLT that the ONU exits the deep-sleep state after completing downlink frame synchronization with the OLT in the synchronization state;

after receiving notification that the ONU enters the deep-sleep state, inhibiting, by the OLT, alarms caused by a case that the ONU fails to respond to an instruction from the OLT because of entering the deep-sleep state, buffering data stream to be transmitted to the ONU in a downlink direction; after receiving notification from the ONU informing that the ONU exits the deep-sleep state, performing, by the OLT, normal data communication with the ONU;

when a power saving mechanism indicated by a power saving mechanism indication in the power saving information is a doze mechanism, the ONU and the OLT performing power saving control based on the obtained power saving information by closing/opening the optical module of the ONU comprises:

notifying, by the ONU, the OLT when requiring entering and exiting a doze mode; closing, by the ONU, an uplink optical module when entering the doze mode, and opening the uplink optical module when exiting the doze mode;

learning, by the OLT, that the ONU requires entering or exiting the doze mode through notification and confirming it;

the method further comprising: when the ONU is in the doze mode, detecting, between the ONU and the OLT, whether the ONU is in a permanent doze state through a heartbeat message;

when a power saving mechanism indicated by a power saving mechanism indication in the power saving information is a cyclic-sleep power saving mechanism, the ONU and the OLT performing power saving control based on the obtained power saving information by closing/opening the optical module of the ONU comprises:

entering, by the ONU, a cyclic power saving state, closing uplink and downlink optical modules, and starting a timer $T_{exit}$ according to a cyclic power saving time allocation that is configured by the OLT or set by the ONU itself;

after the timer $T_{exit}$ expires, exiting, by the ONU, the cyclic power saving state, entering a cyclic power saving wakened state, and opening uplink and downlink optical modules; and before the timer $T_{exit}$ expires, entering, by the ONU, an initial state and starting a timer $T_{initial}$ when the ONU receives a command of exiting the cyclic-sleep power saving mechanism or a command of waking up, which is sent by the OLT through an extended OAM channel, or when the ONU locally detects that there are events of triggering exit of the cyclic-sleep power saving mode, wherein the events comprise transmission of uplink data;

when a power saving mechanism indicated by a power saving mechanism indication in the power saving information is a doze sleep power saving mechanism, the ONU and the OLT performing power saving control based on the obtained power saving information by closing/opening the optical module of the ONU comprises:

entering, by the ONU, a doze power saving state, closing an uplink optical module, and starting a timer $T_{exit}$ according to a doze power saving time allocation that is configured by the OLT or set by the ONU itself;

after the timer $T_{exit}$ expires, exiting, by the ONU, the doze power saving state, entering a doze power saving wakened state, and opening the uplink optical module; and before the timer $T_{exit}$ expires, entering, by the ONU, the initial state and starting a timer $T_{initial}$ when the ONU receives a command of exiting the doze sleep power saving mechanism or a command of waking up, which is sent by the OLT through an extended OAM channel, or when the ONU locally detects that there are events of triggering exit of the doze sleep power saving mode, wherein the events comprise transmission of uplink data.

2. The method according to claim 1, wherein the power saving information comprises at least one of the following: a power saving mechanism indication for indicating a power saving mechanism that is entered and duration information of a power saving mechanism that is entered.

3. The method according to claim 1, wherein passing power saving information comprises:

sending, by the ONU, the power saving information to the OLT through a message; and/or transmitting, by the OLT, the power saving information to the ONU through a message.

4. The method according to claim 1, wherein,
the method further comprises:
after the ONU is wakened from the deep-sleep state that is kept in a preset period of time, ranging by the ONU again.

5. The method according to claim 1, wherein,
the method further comprises:
sending, by the OLT, the ONU the command of exiting the cyclic-sleep power saving mechanism or the command of waking up through the extended OAM channel.

6. The method according to claim 1, wherein,
the method further comprises:
sending, by the OLT, the ONU the command of exiting the doze sleep power saving mechanism or the command of waking up through the extended OAM channel.

7. A system for realizing power saving mechanism management between an Optical Network Unit (ONU) and an Optical Line Terminal (OLT), at least comprising the ONU and the OLT;

wherein the ONU is configured to pass power saving information between the ONU and the OLT through an extended Operation Administration and Maintenance (OAM) frame, and perform power saving control based on the obtained power saving information by closing/opening an optical module; and wherein the OLT is configured to pass power saving information between the OLT and the ONU through the extended OAM frame, and perform power saving control based on the obtained power saving information, wherein the power saving information is included in an organization specific information Type-Length-Value (TLV) field that is in an OAM Protocol Data Unit (PDU) information message of the extended OAM frame; or the power saving information is included in an extended OAM event notification message of the extended OAM frame; or the power saving information is included in an extended OAM PDU format of the extended OAM frame;

wherein, when a power saving mechanism indicated by a power saving mechanism indication in the power saving information is a doze mechanism, the ONU is further configured to:

notify the OLT when requiring entering and exiting a doze mode;

close an uplink optical module when entering the doze mode; and open the uplink optical module when exiting the doze mode; and the OLT is further configured to learn through notification that the ONU requires entering or exiting the doze mode and confirm it;

when a power saving mechanism indicated by a power saving mechanism indication in the power saving information is a cyclic power saving mechanism, the ONU is further configured to:

enter a cyclic power saving state, close uplink and downlink optical modules, and start a timer $T_{exit}$ according to a cyclic power saving time allocation that is configured by the OLT or set by the ONU itself;

after the timer $T_{exit}$ expires, exit the cyclic power saving state, enter a cyclic power saving wakened state, and open uplink and downlink optical modules; and before the timer $T_{exit}$ expires, enter an initial state, and start a timer $T_{initial}$ when the ONU receives a command of exiting the cyclic-sleep power saving mechanism or a command of waking up, which is sent by the OLT through an extended OAM channel, or when the ONU locally detects that there are events of triggering exit of a cyclic-sleep power saving mode, wherein the events comprise transmission of uplink data; and the OLT is further configured to send the ONU the command of exiting the cyclic-sleep power saving mechanism or the command of waking up through the extended OAM channel;

when a power saving mechanism indicated by a power saving mechanism indication in the power saving information is a doze power saving mechanism, the ONU is further configured to:

enter a doze power saving state, close an uplink optical module, and start a timer $T_{exit}$ according to a doze power saving time allocation that is configured by the OLT or set by the ONU itself;

after the timer $T_{exit}$ expires, exit the doze power saving state, enter a doze power saving wakened state, and open the uplink optical module; and before the timer $T_{exit}$ expires, enter an initial state, and start a timer $T_{initial}$ when the ONU receives a command of exiting a doze sleep power saving mechanism or a command of waking up, which is sent by the OLT through an extended OAM channel, or when the ONU locally detects that there are events of triggering exit of the doze sleep power saving mode, wherein the events comprise transmission of uplink data; and the OLT is further configured to send the ONU the command of exiting the doze sleep power saving mechanism or the command of waking up through the extended OAM channel.

8. The system according to claim 7, wherein,
the ONU is further configured to, when detecting that there is no data stream to be received or transmitted in a cyclic power saving activated state, start to apply a cyclic power saving sleep mechanism to save power, set its own state as a cyclic power saving wakened state, and start a timer $T_{cyclic\ power\ saving}$;

enter the cyclic power saving state after the timer $T_{cyclic\ power\ saving}$ expires; and before the timer $T_{cyclic\ power\ saving}$ expires, enter the initial state, and start the timer $T_{initial}$ when the ONU receives a command of exiting the cyclic-sleep power saving mechanism or a command of waking up from the OLT or when the ONU locally detects that there are events of triggering exit of the cyclic-sleep power saving mode, wherein the events comprise transmission of uplink data; and the ONU is further configured to, after entering the initial state, receive a command of permitting to enter the cyclic-sleep power saving mechanism, which is sent by the OLT through the extended OAM channel, start the timer $T_{initial}$, and enter the cyclic power saving activated state after the timer $T_{initial}$ expires.

9. The system according to claim 7, wherein,
the ONU is further configured to, when detecting that there is no data stream to be received or transmitted in a doze power saving activated state, start to apply the doze sleep power saving mechanism to save power, set its own state as a doze power saving wakened state, start a timer $T_{doze\ power\ saving}$;

enter the doze power saving state after the timer $T_{doze\ power\ saving}$ expires; and before the timer $T_{doze\ power\ saving}$ expires, enter the initial state, and start the timer $T_{initial}$ when the ONU receives a command of exiting the doze sleep power saving mechanism or a command of waking up from the OLT or when the ONU locally detects that there are events of triggering exit of the doze sleep power saving mode, wherein the events comprise transmission of uplink data; and the ONU is further configured to, after entering the initial state, receive a command of permitting to enter the doze sleep power saving mechanism, which is sent by the OLT through the extended OAM channel, start the timer $T_{initial}$, and enter the doze power saving activated state after the timer $T_{initial}$ expires.

* * * * *